US010530225B2

(12) United States Patent
Hartmann

(10) Patent No.: US 10,530,225 B2
(45) Date of Patent: Jan. 7, 2020

(54) PROTECTION DEVICE AND ELECTRICAL DRIVE ARRANGEMENT

(71) Applicant: Brose Fahrzeugteile GmbH & Co. KG, Wuerzburg, Wuerzburg (DE)

(72) Inventor: Uwe Hartmann, Wenkheim (DE)

(73) Assignee: BROSE FAHRZEUGTEILE GMBH & CO. KG, WURZBURG, Wurzburg (DE)

( * ) Notice: Subject to any disclaimer, the term of this patent is extended or adjusted under 35 U.S.C. 154(b) by 775 days.

(21) Appl. No.: 14/413,048

(22) PCT Filed: Jul. 8, 2013

(86) PCT No.: PCT/EP2013/002005
§ 371 (c)(1),
(2) Date: Jan. 6, 2015

(87) PCT Pub. No.: WO2014/005724
PCT Pub. Date: Jan. 9, 2014

(65) Prior Publication Data
US 2015/0171710 A1 Jun. 18, 2015

(30) Foreign Application Priority Data

Jul. 6, 2012 (DE) .......................... 10 2012 211 861

(51) Int. Cl.
*H01H 85/48* (2006.01)
*H02K 13/00* (2006.01)
(Continued)

(52) U.S. Cl.
CPC ............. *H02K 13/00* (2013.01); *H01H 85/48* (2013.01); *H01H 85/0241* (2013.01); *H02K 11/25* (2016.01)

(58) Field of Classification Search
CPC .. H01H 37/761; H01H 85/0241; H01H 85/22; H01H 85/48; H02K 11/0047; H02K 11/25; H02K 13/00
(Continued)

(56) References Cited

U.S. PATENT DOCUMENTS 4,132,913 A * 1/1979 Lautner .................. H02K 11/25
310/194
5,773,906 A * 6/1998 Mukai .................... H02K 5/141
310/232

(Continued)

FOREIGN PATENT DOCUMENTS

DE 30 45 540 A1 6/1981
GB 2 248 348 A 4/1992
(Continued)

OTHER PUBLICATIONS

EPO machine translation of Sakurai, JP 2000188852 A.*
(Continued)

*Primary Examiner* — Jacob R Crum
(74) *Attorney, Agent, or Firm* — Westman, Champlin & Koehler, P.A.

(57) ABSTRACT

The invention relates to a protection device for use in an electrical circuit of an electric machine, particularly an electric motor, having a holding device which is designed to receive an hold power supply devices for feeding the electrical current, the holding device being made of a first material with a first melting temperature T1, and temperature protection device, which is designed to protect the electrical circuit from an overtemperature and which is made of a second material with a second melting temperature T2, wherein the first material and the second material are selected, and/or the temperature protection device is arranged, in such a manner that the electrical circuit is automatically interrupted when at least one of the melting
(Continued)

temperatures T1, T2 is reached, wherein the ratio of the first melting temperature T1 to the second melting temperature T2 is in range of greater than 1.2 to equal to 1.50. The invention also relates to an electrical drive arrangement having such a protection device.

12 Claims, 2 Drawing Sheets

(51) Int. Cl.
    *H02K 11/25*     (2016.01)
    *H01H 85/02*     (2006.01)

(58) Field of Classification Search
    USPC .......................................... 337/270
    See application file for complete search history.

(56) References Cited

U.S. PATENT DOCUMENTS

| | | | | |
|---|---|---|---|---|
| 2004/0042147 A1* | 3/2004 | Gross | ................... | H01H 37/761 |
| | | | | 361/118 |
| 2004/0263009 A1* | 12/2004 | Noda | ................... | F04D 25/082 |
| | | | | 310/71 |
| 2007/0102931 A1* | 5/2007 | Oohashi | ................. | H02K 5/141 |
| | | | | 290/30 R |
| 2007/0200354 A1* | 8/2007 | Kusumoto | .............. | F02N 11/10 |
| | | | | 290/38 R |
| 2010/0045421 A1* | 2/2010 | Dauth | ................... | H01H 37/761 |
| | | | | 337/407 |
| 2010/0249342 A1* | 9/2010 | Unohara | ............ | C08G 75/0213 |
| | | | | 525/535 |
| 2011/0057761 A1 | 3/2011 | Wang et al. | | |
| 2011/0058295 A1 | 3/2011 | Wang et al. | | |

FOREIGN PATENT DOCUMENTS

| | | |
|---|---|---|
| JP | 2000 188852 A | 7/2000 |
| WO | 2008/043624 A1 | 4/2008 |

OTHER PUBLICATIONS

EPO machine translation of Caruso WO 2008043624 A1.*
International Search Report for PCT/EP2013/02005, dated Oct. 24, 2013, 4 pages.
Office Action for Korean Patent Application No. 10-2015-7003137, dated Jun. 30, 2016, 14 pages.

* cited by examiner

PROTECTION DEVICE AND ELECTRICAL DRIVE ARRANGEMENT

CROSS-REFERENCE TO RELATED APPLICATION

This Application is a Section 371 National Stage Application of International Application No. PCT/EP2013/002005, filed 8 Jul. 2013 and published as WO 2014/005724 A1 on 9 Jan. 2014, in English, the contents of which are hereby incorporated by reference in their entirety.

FIELD OF THE INVENTION

The present invention relates to a protection device for use in an electric circuit of an electrical machine, in particular of an electric motor, and to an electrical drive arrangement.

TECHNICAL BACKGROUND

The present invention relates to a thermal protection device for use in an electric circuit of an electrical apparatus, in particular an expendable thermal protection device for use in electric motors in the field of motor vehicles.

DE 30 45 540 A1 discloses a protection device for an electric circuit, in particular in an electric motor, e.g. for a radiator fan or an air conditioning system.

For many electric motors used in the field of motor vehicles, a thermal protection device, which is also referred to in the following as a thermal protector for the sake of simplicity, is used on the basis of what are known as soldered chokes. Said chokes consist substantially of a coil spring consisting of wire material, i.e. one or more wire portions, the wire material breaking at a point which is generally in the centre of the coil spring based on the longitudinal orientation thereof, and the ends of the wire portions, which are also generally referred to in this application as contact means connected in series, are soldered using a solder material while being biased against one another.

Said chokes are arranged in an electric circuit of an electric motor and have the function of both eliminating interference in the electric circuit and protecting the electronic components against undesired temperature increases. If a determined limit temperature is reached, the solder material which is electrically interconnecting the two wire-portion ends melts. Owing to the mechanical bias prevailing between the two wire-portion ends, the two soldered wire-portion ends spring apart and the electric circuit is broken. Since it is impossible to reverse the breaking, this is also referred to as an expendable thermal protector.

Conventionally, such soldered chokes contain lead-containing solder material, generally Sn63Pb, having a melting point of approximately 183° C. However, there have been Europe-wide guidelines in force for a few years, according to which, inter alia, lead-containing solder materials can no longer be used for consumer products. Lead-free solder materials having correspondingly higher melting points therefore have to be used. The melting point or melting range of lead-free solder material is typically in the range greater than 220° C.

Electric motors conventionally comprise what is referred to as a holding device, which is also termed a brush holder. This holding device is used to receive, hold and guide power supply apparatuses, such as carbon brushes. The holding device can, for example, be a unit consisting of a voltage regulator and a pair of carbon brushes, which are used to supply the electric motor with power, for the operation thereof, by means of sliding contacts of a commutator arranged on the rotary shaft of the electric motor. The holding device is generally produced from a plastics material, the soldered choke being directly fixed to the brush holder.

If the material of the holding device or the brush holder material is not suitable for use at higher temperatures, the relatively high melting point required for the lead-free solders occasionally leads to failure of a fire protection system if additional measures are not taken. Since the material of the holding device softens, the carbon brushes can no longer be adequately pressed against the commutator in order to ensure a reliable electrical contact. There may therefore be a time delay in a temperature increase acting on the soldered choke, and therefore said choke is not triggered in a timely manner, i.e. the circuit is not broken in a timely manner.

SUMMARY OF THE INVENTION

Against this background, the problem addressed by the present invention is that of providing an improved thermal protector for an electric circuit.

This object is achieved according to the invention by a protection device having the features of claim 1 and/or by an electrical drive arrangement having the features of claim 1.

The following is accordingly provided:
- an electric circuit for supplying an electric machine, in particular an electric motor, with an electric current, comprising a holding device which is designed to receive and hold power supply apparatuses for supplying the electric current to the electric motor, the holding device being formed of a first material having a first melting point T1, and comprising a thermal protection device which is designed to protect the electric circuit against excessive temperatures and is formed of a second material having a second melting point T2, the first material and the second material being selected such and/or the thermal protection device being arranged such that the electric circuit is independently broken when at least one of the melting points T1, T2 is reached, the ratio of the first melting point T1 to the second melting point T2 being in the range of greater than 1.2 to equal to 1.50.
- an electrical drive arrangement comprising an electric machine having an electric circuit for powering the electric machine and a protection device according to the invention, which is arranged in series in a current path of the electric circuit.

The present invention is based on the idea of selecting the materials for the holding device and the thermal protection device (which is largely or completely lead-free) in a targeted manner with regard to their melting points T1 and T2 respectively. These materials are selected such that a quotient T1/T2 of the melting point of the holding device in relation to the thermal protection device produces a value greater than 1.2. If solders having melting ranges are used, i.e. having a non-eutectic composition, the two limit temperatures of the melting range have to meet this requirement. This ensures that the function of the thermal protection device is always ensured in the event of excessive temperatures, whilst the function of the electric motor is not impaired unless the melting point of the thermal protection device is reached.

As already explained, this is achieved by selecting materials having suitable melting points or melting point ranges T1, T2, the requirement of using non-lead-containing materials for the thermal protection device still being complied with.

Advantageous embodiments and developments of the invention can be found in the dependent claims and in the description with reference to the figures.

In a first embodiment, the second material for the thermal protection device comprises a lead-free solder material. As already mentioned at the outset, this is necessary in particular in order to comply with the current legal guidelines of the EU. This is advantageous from a health perspective in particular. In addition, the recycling of such lead-free materials, which is becoming ever more important, is simpler, and should take preference for ecological reasons.

In another embodiment, the lead-free solder material has a silver content as an alloy component. A silver content in the solder material can increase the melting point of the solder material, and this can be advantageous when selecting a combination comprising materials for the holding device having a corresponding melting point. It is then easier to find material pairs that comply with said T1/T2 quotient of greater than 1.2.

In another preferred embodiment, the second material for the thermal protection device comprises one of the following materials or a combination thereof: SnCu0.7Ni, Sn95Ag4Cu1, Sn96Ag4, Sn95.5Ag3.5 and/or Cu. The melting points of these materials have the advantageous effect whereby, in combination with the melting points of the materials set out below for the holding device, i.e. polyphthalamide (PPA) and/or polyphenylene sulfide (PPS), they meet the required condition according to the invention (i.e. T1/T2 of greater than 1.2).

In a preferred embodiment, the ratio of the first melting point T1 to the second melting point T2 is in the range of greater than 1.20 to 1.50. It is particularly preferable for the ratio of the first melting point T1 to the second melting point to be in the range between 1.23 and 1.40.

In another preferred embodiment, the thermal protection device is attached directly to the holding device by means of fixing elements 190 or means. This has the advantage whereby a time delay in an effect of a temperature increase on the thermal protection device can be kept as low as possible. Such an electric circuit 170 having a thermal protection device of this type can be accommodated within a housing 200 of an electric motor 180. This is particularly advantageous, since, as is well known, thermal stress on such a motor is relatively high.

Typically, the holding device is designed for receiving and guiding at least two carbon brushes 140, which are formed as power supply apparatuses for supplying the electric current to the electric motor 180. Different numbers and types of power supply apparatuses would, however, also be conceivable.

In another embodiment, the electric machine is formed as an electric motor 180 for a motor vehicle, which electric motor 180 is arranged having its current-carrying load path in series with a current path of the electric circuit 170 and the thermal protection device. In a particularly preferred embodiment, the electric motor 180 is formed as a radiator fan motor and/or an air conditioning system motor.

The above embodiments and developments can be combined in any conceivable manner, as long as this is reasonable. Further possible embodiments, developments and uses of the invention also include combinations of features of the invention, in particular of the materials, described above or below with respect to the embodiments, even if not explicitly stated. In this context, a person skilled in the art will more particularly also add individual aspects as improvements or additions to the respective basic form of the present invention.

DESCRIPTION OF THE DRAWINGS

The present invention will be explained in greater detail below on the basis of the embodiments specified in the schematic figures of the drawings, in which.

Figure 1:
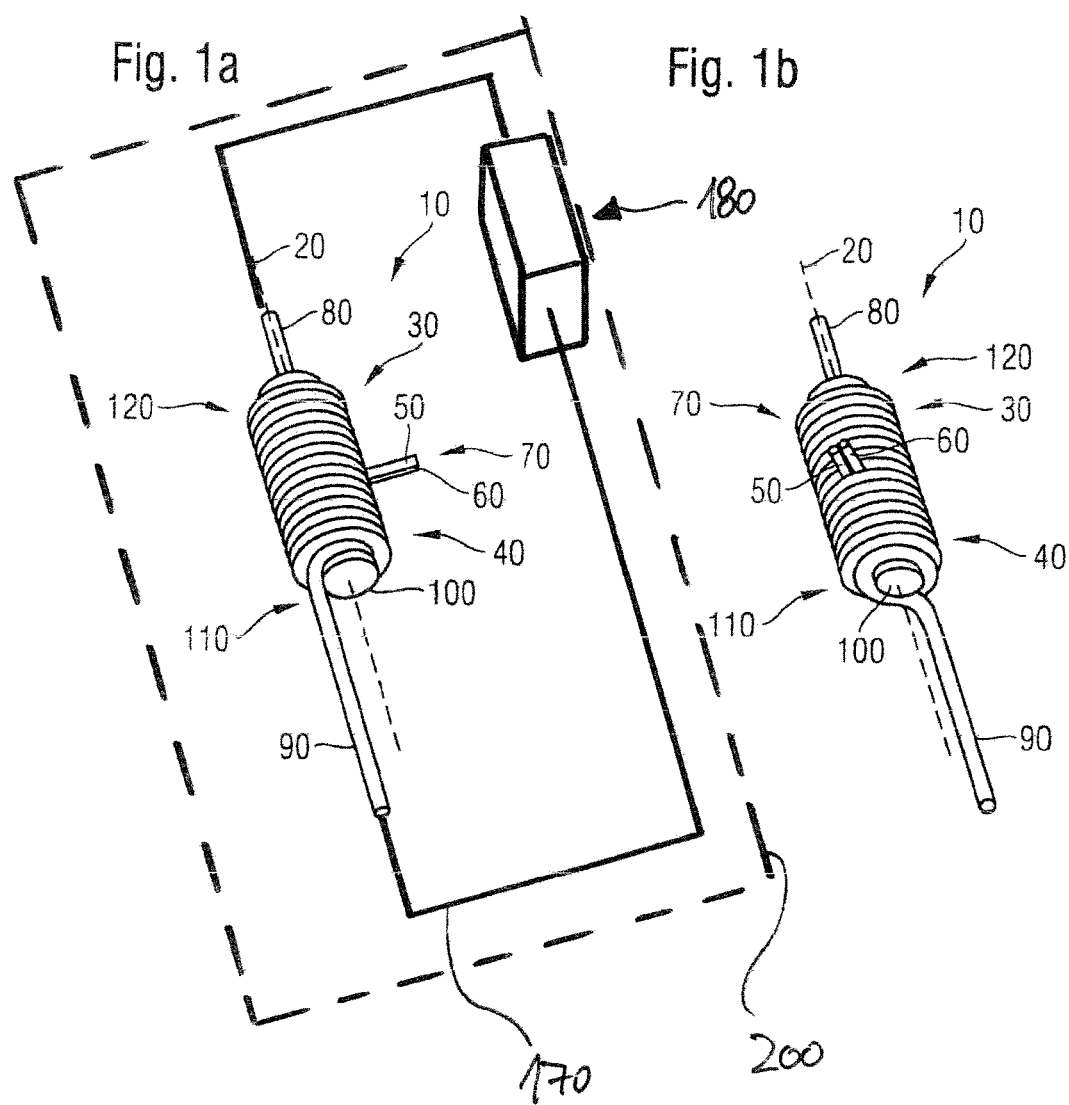
FIG. 1a, 1b are two different views of a soldered choke.

The accompanying drawings are intended to convey further understanding of the embodiments of the invention. They show embodiments of the invention and, in conjunction with the description, clarify the principles and concepts behind the invention. Other embodiments and many of the advantages mentioned become apparent with respect to the drawings. The elements of the drawings are not necessarily shown true to scale in relation to each other.

In the figures, like and functionally identical elements, features and components of various embodiments have been provided with the same reference numerals, unless indicated otherwise.

DESCRIPTION OF EMBODIMENTS

FIGS. 1a and 1b are each perspective views of one and the same soldered choke 10, the soldered choke 10 in FIG. 1b being rotated by 90° about its longitudinal axis 20 in an anti-clockwise direction in relation to the soldered choke 10 shown in FIG. 1a to better understand the structure of the soldered choke 10.

With reference to both FIGS. 1a and 1b, the soldered choke 10 in each case has wire portions 30, 40 which are each shaped helically into coils. At abutting wire ends 50, 60, which each point away from the soldered choke 10, the wire portions 30, 40 are soldered using solder material (not shown here) while being mechanically biased towards a solder point 70. The mechanical bias ensures that, when the solder material melts, the wire ends 50, 60 are urged to move away from one another in opposite directions, and they thus break or open an electric circuit 170, since the other wire ends 80, 90 are connected in series with said electric circuit 170. This opening ensures that a power supply to an electrical apparatus having the soldered choke 10, for example a radiator fan motor or an air conditioning fan motor of a motor vehicle, is broken and thus operation of the electric motor is stopped. This prevents the electric motor 180 or parts thereof from overheating and possibly causing a fire.

Again with reference to both FIGS. 1a and 1b, the soldered choke 10 has a ferrite core 100, the function of which is already explained above. By means of a form fit, the ends 110, 120 at either end of the helical wire portions 30, 40 form fixed clamping points for the ferrite core 100.

For the sake of completeness, it is also noted that the wire portions 30, 40 generally have an outer insulating layer (enamelled copper wire), but the wire ends 50, 60 for producing an electrical contact therebetween are bare. It is thus ensured that, when the solder point 70 springs open, the current cannot continue to flow through adjacent choke windings.

Enamelled wires made of a base material other than copper can only be obtained commercially with relative difficulty and also at relatively great expense. By following the method according to the invention, a temperature curve of the temperature increase of the soldered choke can be passed through as quickly as possible, and thus the amount of heat supplied to the copper is limited, even when the melting point of the solder material is relatively high. This is necessary because copper, which is subjected to high temperatures for long periods of time, begins to recrystallize, in other words, voltages in the material are reduced in the material since the structure of the material regenerates. The speed of this voltage drop depends on the temperature, the length of time for which the temperature is applied, and a degree of deformation of the copper. The result of the voltage drop is that, even when the melting point of the solder material is reached, a soldered choke can no longer be "triggered" or open, since the tension of a helical spring (represented by the wire portions 30, 40 of the soldered choke 10) is reduced or completely removed by the regeneration of the material structure. This is prevented by selecting a corresponding material combination in accordance with the method according to the invention, since, as is explained in more detail below with reference to FIG. 2, a more reliable contact of a carbon brush to a commutator of the electric motor 180 can be ensured over the entire heating phase, and thus the heating curve can be passed through as quickly as possible. The amount of heat supplied thus to the copper material is therefore limited to the extent that sufficient tension is maintained in the helical-spring-shaped wire portions 30, 40 and reliable opening of the soldered wire ends 50, 60 is ensured.

Figure 2:
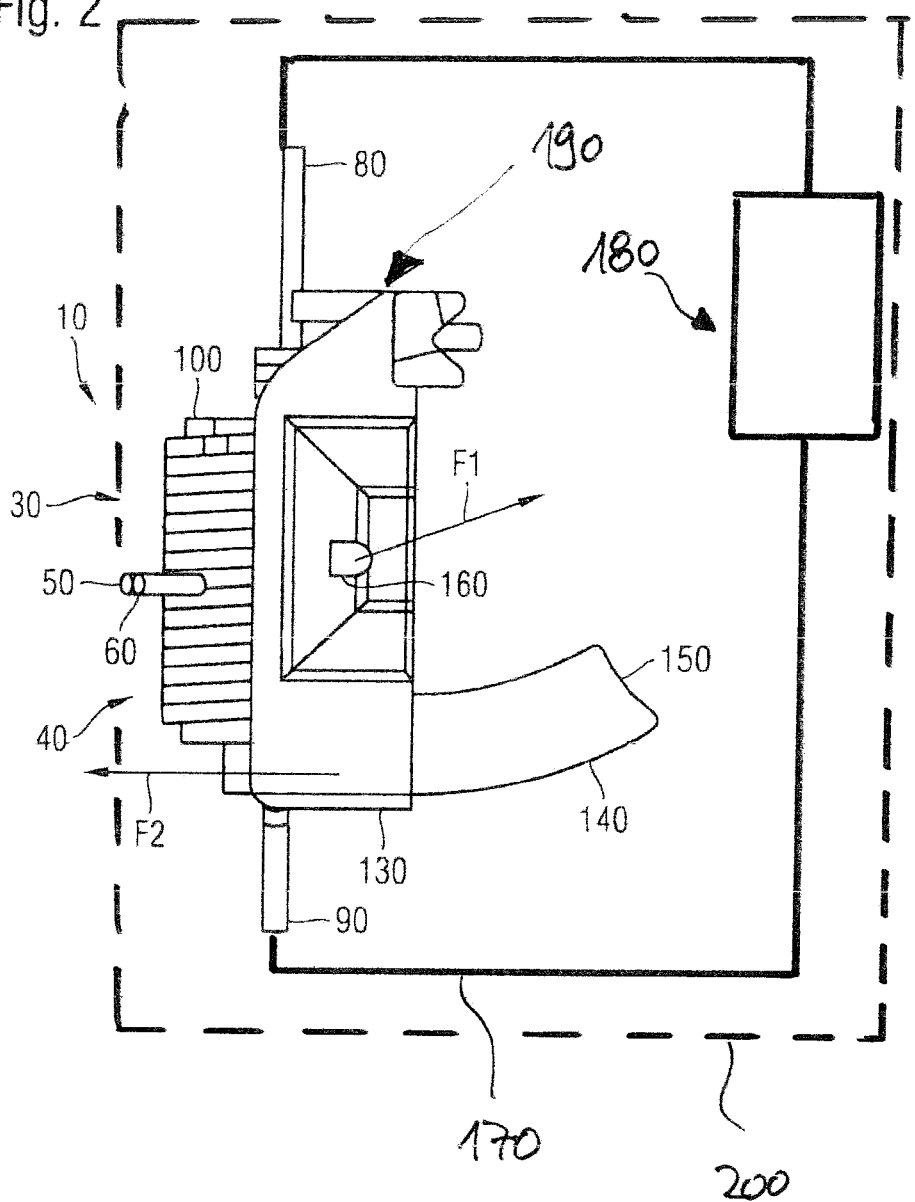
FIG. 2 shows a holding device comprising a carbon brush and a soldered choke fixed to the holding device.

In a similar manner to FIGS. 1a and 1b, FIG. 2 shows a soldered choke 10 comprising wire portions 30, 40, wire ends 50, 60 that have been welded together, additional wire ends 80, 90 (for coupling to an electric circuit), and a ferrite core 100 arranged in the wire portions 30, 40.

In the example shown in FIG. 2, the soldered choke 10 is fixed to a holding device 130, which is used to receive and guide power supply apparatuses 140. For reasons of clarity, FIG. 2 only shows one power supply apparatus 140. The power supply apparatus 140 is a carbon brush which, in the example shown in FIG. 2, is guided through the holding device 130 formed as a hammer brush holder and presses, in a known manner, onto a commutator of an electric motor 180 to create a power supply. For this purpose, a spring (not visible here) arranged in the holding device 130 presses a carbon brush contact surface 150 onto the commutator in order to ensure uniform contact with the commutator over time in the event of wear of the carbon brush contact surface 150.

As already mentioned at the outset, the material for the thermal protection device or soldered choke 10 comprises one of the following materials or a combination thereof: Sn96Ag4, SnCu0.7Ni, Sn95Ag4Cu1, Sn96Ag4, Sn95.5Ag3.5, and/or Cu, and the material for the holding device preferably comprises a plastics material made of one of the following materials or a combination thereof: polyphthalamide (PPA) and/or polyphenylene sulfide (PPS).

The melting points of the above-mentioned materials are given by way of example:

| Material | Melting point |
| --- | --- |
| Sn96Ag4: | 221° C. |
| SnCu0.7Ni: | 227° C. |
| Sn95Ag4Cu1: | 227° C. |
| PPA: | 310° C. |
| PPS: | 280° C. |

With various material combinations, a quotient of a melting point value of a solder material and a melting point value of a holding device material is thus in the range between 1.23 and 1.40, corresponding to the basic principle of the present invention.

Furthermore with reference to FIG. 2, a force F1 acts in the direction of an arrow F1 in order to fix the holding device 130 relative to the rotating commutator within the electric motor 180 on a fixing portion 160 of the holding device 130.

In addition, a reaction force, indicated by an arrow F2, is produced by the spring load of the carbon brushes 140 onto the commutator.

As already indicated above, this is important in this respect, since, when the material of the holding device 130 heats up, a reliable electrical contact between the carbon brush contact surface 150 and the commutator is no longer ensured in some circumstances, because the material of the holding device 130 (generally made of a plastics material) "floats away" and no longer allows for a defined distance of the holding device 130 or the carbon brush 140 from the commutator. To avoid this situation, the present invention therefore proposes a combination of the above-mentioned materials, although other materials having suitable properties, i.e. melting points, are also conceivable.

Although the present invention has been fully described above by means of preferred embodiments, it is not limited thereto, but rather may be modified in a number of ways.

It should also be noted that the invention is not only applicable in the field of motor vehicles, but in any field where an expendable thermal protector is required for an electrical apparatus, for example an electric motor.

LIST OF REFERENCE NUMERALS 10 soldered choke
20 longitudinal axis of the soldered choke
30 wire portion of the soldered choke
40 wire portion of the soldered choke
50 wire end of the soldered choke
60 wire end of the soldered choke
70 solder point
80 additional wire end of the soldered choke
90 additional wire end of the soldered choke
100 ferrite core of the soldered choke
110 portion of the soldered choke
120 portion of the soldered choke
130 holding device
140 power supply apparatus/carbon brush
150 carbon brush contact surface

The invention claimed is:

1. A protection device for use in an electric circuit of an electric machine or an electric motor, comprising:
a holding device which is designed to receive and hold power supply apparatuses for supplying an electric current, the holding device being formed of a first material having a first melting point T1, the holding device having a first distal end and a second proximal opposite end, the holding device further comprising a fixing portion configured to bias the holding device against an external commutator; and
a thermal protection device which is designed to protect the electric circuit against excessive temperatures and is formed of a second material having a second melting point T2, the first material and the second material being selected such or the thermal protection device being arranged such that the electric circuit is independently broken when at least one of the melting points T1, T2 is reached, the thermal protection device comprising a coil, the coil comprising a first helical portion with a first end held in the first distal end of the holding device and a second helical portion with a first end held in the second proximal end of the holding device, each coil portion having a second end, the second ends biased away from each other and coupled together with a solder joint;

wherein the ratio of the first melting point T1 to the second melting point T2 is in the range of greater than 1.2 to equal to 1.50.

2. The protection device according to claim 1, wherein the second material of the thermal protection device comprises a lead-free solder material.

3. The protection device according to claim 2, wherein the lead-free solder material has a silver content as an alloy component.

4. The protection device of claim 1, wherein the second material of the thermal protection device comprises one of the following materials or a combination thereof: Sn96Ag4, SnCu0.7Ni, Sn95Ag4Cu1, Sn96Ag4, Sn95.5Ag3.5 and/or Cu.

5. The protection device of claim 1, wherein the material for the holding device comprises at least one material selected from the group consisting of polyphthalamide (PPA) and polyphenylene sulfide (PPS).

6. The protection device of claim 1, wherein the thermal protection device is attached directly to the holding device by means of fixing elements.

7. An electrical drive arrangement comprising an electric machine, an electric circuit for powering the electric machine, and a protection device arranged in series in a current path of the electric circuit, wherein the protection device comprises:

a holding device being formed of a first material having a first melting point T1, the holding device designed to receive and reliably hold power supply apparatuses therein at temperatures up to the first melting point, for supplying an electric current; and a thermal protection device which is designed to protect the electric circuit against excessive temperatures and is formed of a second material having a second melting point T2, the first material and the second material being selected or the thermal protection device being arranged such that the electric circuit is broken when the melting point T1 is reached, and is independently broken when the melting point T2 is reached, the thermal protection device comprising a coil, the coil comprising a first helical portion with a first end held in a first distal end of the holding device and a second helical portion with a first end held in a second, opposite proximal end of the holding device, each coil portion having a second end, the second ends biased away from each other and coupled together with a solder joint;

wherein the ratio of the first melting point T1 to the second melting point T2 is in the range of greater than 1.2 to equal to 1.50.

8. The arrangement of claim 7, wherein the electric machine includes an electric motor, and the holding device is designed to receive and guide at least two carbon brushes, which are formed as power supply apparatuses for supplying the electric current to the electric motor.

9. The drive arrangement according to claim 7, wherein the electric machine includes an electric motor for a motor vehicle, wherein the electric motor includes a current-carrying load path in series with a current path of the electric circuit and the thermal protection device.

10. The arrangement of claim 9, wherein the electric motor is formed as at least one of a radiator fan motor and an air conditioning system motor.

11. The protection device of claim 1, wherein the thermal protection device further comprises a ferrite core arranged in the coil, wherein the ferrite core has a first end and a second end arranged at the first end of the first helical portion and the first end of the second helical portion, respectively.

12. The protection device of claim 11, wherein the first end and the second end of the ferrite core form fixed clamping points for the ferrite core.

* * * * *